US010447910B2

(12) United States Patent
Bostick et al.

(10) Patent No.: US 10,447,910 B2
(45) Date of Patent: Oct. 15, 2019

(54) CAMERA NOTIFICATION AND FILTERING OF CONTENT FOR RESTRICTED SITES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/228,118

(22) Filed: Aug. 4, 2016

(65) Prior Publication Data
US 2018/0041686 A1 Feb. 8, 2018

(51) Int. Cl.
H04N 5/232 (2006.01)
(52) U.S. Cl.
CPC ..... H04N 5/23206 (2013.01); H04N 5/23225 (2013.01)
(58) Field of Classification Search
CPC ......... G09G 2320/068; G08B 13/1963; G08B 13/19689; G08B 13/1966; H04N 5/23216; H04N 5/2259; H04N 1/00408–00472; H04N 1/00103–00108; H04N 1/32776; G06F 3/005; G06F 3/01–05; G03B 2213/00–025; G03B 13/00–16

USPC ..... 348/207.1, 207.11, 211.99, 211.1, 211.2, 348/211.3, 211.4, 211.9
See application file for complete search history.

(56) References Cited

U.S. PATENT DOCUMENTS

| 6,738,572 | B2 | 5/2004 | Hunter |
| 7,821,542 | B2 | 10/2010 | Lee et al. |
| 7,933,611 | B2 | 4/2011 | Bocking et al. |
| 8,098,282 | B2 | 1/2012 | Gopinath et al. |
| 8,219,144 | B2 | 7/2012 | Benco et al. |

(Continued)

FOREIGN PATENT DOCUMENTS

WO 2010/044837 4/2010

OTHER PUBLICATIONS

Caramba App Developement, "EasyMeasure—Measure with Your Camera", https://itunes.apple.corrilus/app/easymeasure-measure-your-camera!/id3 . . . , 2014; 2 Pages.

(Continued)

Primary Examiner — Xi Wang
(74) Attorney, Agent, or Firm — Brian Restauro; Andrew D. Wright; Roberts Mlotkowski Safran Cole & Calderon, P.C.

(57) ABSTRACT

Systems and method for determining and indicating camera restrictions are disclosed. A method includes: receiving, by a camera device, an input to capture content; determining, by the camera device, a field of view of the camera device; transmitting, by the camera device, data defining the field of view to a server; receiving, by the camera device, a data structure from the server; and based on the data structure, performing one of: capturing the content with the camera device without restriction; and performing at least one restriction action at the camera device.

20 Claims, 5 Drawing Sheets

(56) References Cited

U.S. PATENT DOCUMENTS

| | | | |
|---|---|---|---|
| 8,600,110 B1 | 12/2013 | Chan et al. | |
| 2004/0257463 A1* | 12/2004 | Goris | H04N 5/232 348/372 |
| 2006/0028558 A1* | 2/2006 | Sato | H04N 1/00281 348/211.99 |
| 2008/0055408 A1* | 3/2008 | Wun | H04N 1/00103 348/122 |
| 2009/0179752 A1* | 7/2009 | Patel | H04M 1/72572 340/539.13 |
| 2010/0210293 A1* | 8/2010 | Lim | H04M 1/274516 455/466 |
| 2011/0258344 A1* | 10/2011 | Mukherjee | H04N 19/17 709/247 |
| 2013/0114849 A1* | 5/2013 | Pengelly | G06F 17/289 382/103 |
| 2014/0078164 A1 | 3/2014 | Chan et al. | |
| 2014/0168432 A1* | 6/2014 | Nystrom | H04N 5/23212 348/143 |
| 2014/0176663 A1 | 6/2014 | Cutler et al. | |
| 2014/0185877 A1* | 7/2014 | Suzuki | G06F 17/3079 382/103 |
| 2014/0185957 A1* | 7/2014 | Kim | H04N 5/2628 382/283 |
| 2014/0274145 A1 | 9/2014 | Cronin et al. | |
| 2015/0124109 A1 | 5/2015 | Kryeziu | |
| 2015/0172449 A1 | 6/2015 | Clavenna et al. | |
| 2015/0172534 A1* | 6/2015 | Miyakawa | H04N 5/23216 348/222.1 |
| 2015/0189122 A1* | 7/2015 | Hoshika | H04N 5/2258 348/239 |
| 2015/0215535 A1 | 7/2015 | Takahashi | |
| 2015/0271135 A1 | 9/2015 | Tseng et al. | |
| 2016/0035074 A1* | 2/2016 | Jeong | G06T 11/60 382/282 |

OTHER PUBLICATIONS

Smart Tools Co. "Smart Measure", Android App, https://play.google.com/store/apps/details?id=kr.sira.measure&hl=en, May 17, 2015; 4 Pages.

PotatotreeSoft, "Auto Distance", Android App, https://play.google.com/store/apps/details?id=com.potatotree.autodistance, Jul. 6, 2015; 4 Pages.

Wikipedia, "Sound Localization", https://en.wikipedia.org/wiki/Sound_localization, Jul. 25, 2015; 10 Pages.

Wikipedia, "Acoustical Engineering", https://en.wikipedia.org/wiki/Acoustical_engineering, Jul. 22, 2015; 6Pages.

Yus et al., "FaceBlock: Privacy-Aware Pictures for Google Glass", UMBC Ebiquity, http://ebiquity.umbc.edu/paper/html/id/652/FaceBlock-Privacy-Aware-Pictures-for-Google-Glass, Jun. 16, 2014; 2 Pages.

Yang et al., "InSight: Recognizing Humans without Face Recognition", ACM HotMobile '13, Feb. 26-27, 2013; 6 Pages.

Pappachan et al., "A Semantic Context-Aware Privacy Model for FaceBlock", InProceedings, Second International Workshop on Society, Privacy and the Semantic Web—Policy and Technology, Oct. 2014; 9 Pages.

\* cited by examiner

CAMERA NOTIFICATION AND FILTERING OF CONTENT FOR RESTRICTED SITES

BACKGROUND

The present invention generally relates to cameras, and more particularly, to notifying a user when their camera is focusing on a restricted site.

Recent advances in technology are such that portable cameras are becoming increasingly common. When a user is capturing a photo or video with their camera, the camera captures a wider viewing area for the visible surroundings as well as audio from the captured location. There are many situations and locations, such as business premises, museums, cinemas, private property, etc., where use of cameras is necessarily restricted or prohibited.

In the past, such restriction and/or prohibition has been attempted to be achieved by displaying signs indicating the restriction or prohibition on photography in a specified location, and relying on individuals to adhere to such instructions. With the printed sign method, the user must deduce from signs that the capture of video, images, or audio for a given location is restricted. This includes understanding of exact locations that are allowed as well as restricted, which is difficult to know with accuracy.

With the integration of cameras and computer devices, location based disabling has also become an option for imposing restrictions of photography. In some cases, a location of the camera is determined, e.g., by global positioning system (GPS), and the camera is automatically disabled when the camera location is within a restricted location. However, these systems are based on a location of the camera itself, and not a location of an area that is in a field of view of the camera.

SUMMARY

In an aspect of the invention, there is a method implemented in a camera device. The method includes: receiving, by the camera device, an input to capture content; determining, by the camera device, a field of view of the camera device; transmitting, by the camera device, data defining the field of view to a server; receiving, by the camera device, a data structure from the server; and based on the data structure, performing one of: capturing the content with the camera device without restriction; and performing at least one restriction action at the camera device.

In another aspect of the invention there is a camera device that includes: a lens; an image sensor; a processor; a location module configured to determine coordinates of a field of view of the camera device; and a restriction module configured to call a server with the determined coordinates of the field of view to determine whether a restricted area overlaps the field of view.

In another aspect of the invention, there is a system that includes a server and a data repository. The server is configured to: receive input identifying restricted areas and store data defining coordinates of the restricted areas in the data repository; receive, from a camera device, a service call containing coordinates of a field of view of the camera device; based on the receiving the service call, determine whether any of the restricted areas overlap the field of view by comparing the coordinates of the field of view to the coordinates of the restricted areas; and based on the determining, transmit a data structure to the camera device indicating whether any of the restricted areas overlap the field of view.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
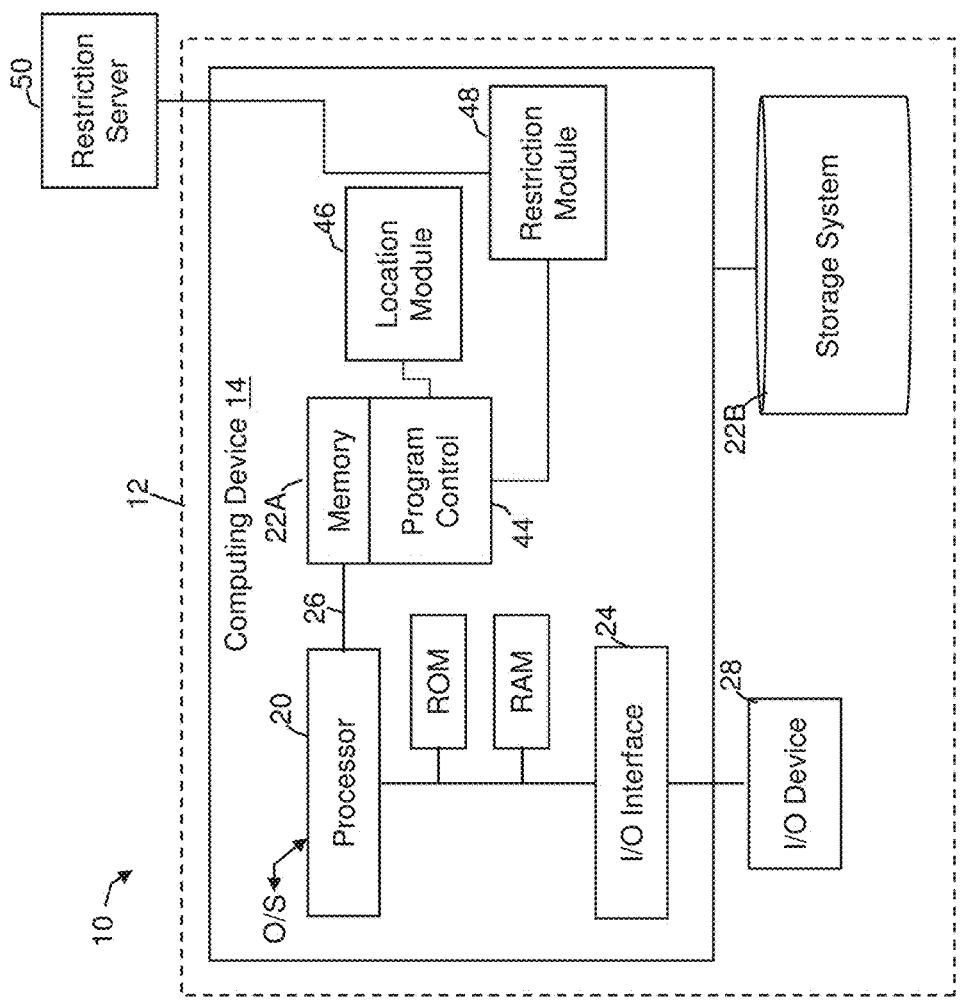
FIG. 1 is an illustrative environment for implementing the steps in accordance with aspects of the invention.

The present invention generally relates to cameras, and more particularly, to notifying a user when their camera is focusing on a restricted area. In accordance with aspects of the invention, a camera compares a determined focus area (e.g., field of view) of the camera to a repository of restricted focus areas. When the focus area of the camera does not match a restricted focus area in the repository, the camera is enabled to capture video, images, or audio in a normal manner. When the focus area of the camera does match a restricted focus area in the repository, the camera notifies the user of the restricted focus area. In embodiments, the camera may present the user with a display of the restricted focus area boundary. In embodiments, the camera may filter content from the video, images, or audio based on the restricted focus area. In embodiments, the camera may permit the user to pay a fee to un-filter content, i.e., to capture video, images, or audio that would otherwise be filtered based on the restricted focus area. In embodiments, the camera performs one or more of these functions automatically using a computer device. In this manner, the user is automatically notified of restricted focus areas. Implementations of the invention thus reduce uncertainty of whether the user is permitted to capture video, images, or audio with their camera.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a computing system 12 that can perform the processes described herein. In particular, system 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a touch screen, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a location module 46 and a restriction module 48 that perform one or more of the processes described herein. The location module 46 and restriction module 48 can be implemented as one or more program code in program control 44 stored in memory 22A as separate or combined modules. Additionally, the location module 46 and restriction module 48 can be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

In embodiments, the location module 46 determines a field of view (or a focus area) of a camera system of the computing device 14. For example, the location module 46 may be configured with appropriate programming to determine a set of coordinates (e.g., longitude and latitude coordinates) that define a field of view of a camera system of the computing device 14. The set of coordinates may be determined by the location module 46 using data from sensors such as a GPS sensor, gyroscope, and magnetometer compass that are included in the computing device 14.

In aspects, the restriction module 48 receives the determined field of view from the location module 46 and compares the field of view to a predefined repository of restricted focus areas that are available via a restriction server 50. Based on the comparing, the restriction module 48 may perform one of: (i) enable the camera system of the computing device 14 to capture video, images, or audio in a normal manner; and (ii) notify the user of the restricted focus area and impose a restriction on the ability of the camera system to capture video, images, or audio of the restricted focus area.

In embodiments, the restriction server 50 may contain or have access to a repository that stores data defining restricted areas. The restriction server 50 may be configured to permit an entity (e.g., government agencies, businesses, individuals, etc.) to define coordinates of a restricted area and/or restricted object. The restriction server 50 may be configured to permit the entity to define types of restrictions associated with a restricted area and/or restricted object, such as video restriction, image (photo) restriction, and audio restriction. The restriction server 50 may include an interface (e.g., a web service or application program interface (API)) to allow the restriction module 48 to perform a real-time check to determine whether the determined field of view overlaps a restricted area. The computing device 14 may communicate with the restriction server 50 using wireless communication over a network, including but not limited to 3G or 4G network or WiFi.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, system 12 is only illustrative of various types of computer infrastructures for implementing the invention. For example, in embodiments, system 12 comprises two or more computing devices (e.g., a server cluster) that communicate over any type of communications link, such as a network, a shared memory, or the like, to perform the process described herein. Further, while performing the processes described herein, one or more computing devices on system 12 can communicate with one or more other computing devices external to system 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
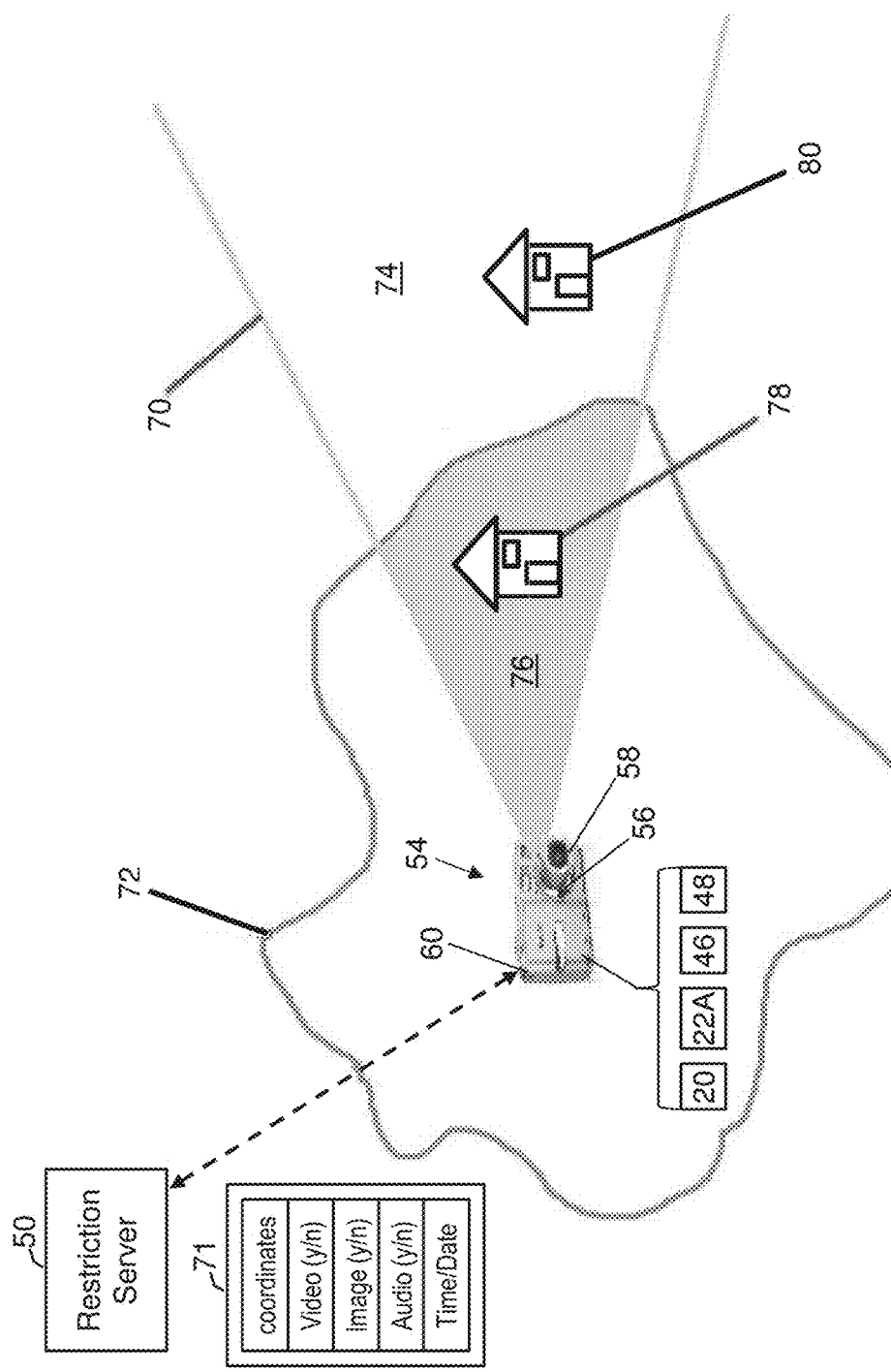
FIG. 2 shows an exemplary environment in accordance with aspects of the invention.

FIG. 2 shows an exemplary environment in which the computing device (e.g., computing device 14 of FIG. 1) is implemented as a camera device 54, such as a smartphone, tablet computer, laptop computer, or digital camera such as a digital point-and-shoot camera or digital single-lens reflex camera (also called a digital SLR or DSLR). For example, as shown in FIG. 2, the camera device 54 may include a processor 20, memory 22A, program control 44, location module 46, and restriction module 48, e.g., as described with respect to FIG. 1. The camera device 54 may also include an image sensor 56 (e.g., a complementary metal-oxide-semiconductor (CMOS) image sensor) and a lens 58. The camera device 54 may also include a display system such as an LCD screen. The camera device 54 may include at least one of a GPS sensor, a gyroscope, and a magnetometer compass (not shown). The camera device 54 may include a wireless communication system including an antenna 60. The camera device 54 may provide conventional digital camera functionality by collecting light through the lens 58, capturing an image with the image sensor 56, optionally performing digital processing of the captured image via the processor 20, storing data defining the image in memory 22A, and displaying the image on the display.

As depicted in FIG. 2, the camera device 54 is pointed in a particular direction for the purpose of capturing a video or photograph. In accordance with aspects of the invention, when the user of the camera device 54 initiates taking a picture with the camera device 54 (e.g., presses a physical button or a virtual button on the camera device 54), the location module 46 determines a field of view 70 (or a focus area) of the camera device 54. In embodiments, the location module 46 determines a set of coordinates (e.g., longitude and latitude coordinates) that define the field of view 70. The set of coordinates may be determined by the location module 46 using algorithms and data from sensors such as a GPS sensor, gyroscope, and magnetometer compass that are included in the camera device 54, in addition to software that determines a distance from the camera device 54 to objects within the field of view 70. In embodiments, the location module 46 determines a current boundary in focus and identifies geo-location points in the boundary.

In aspects of the invention, after determining the field of view 70, the restriction module 48 performs a real-time check to determine whether the field of view 70 has any pre-defined restrictions. In embodiments, the restriction module 48 places a service call to the restriction server 50 using wireless communication via the antenna 60. The service call may be made using an application program interface (API) of the restriction server 50 and may include the coordinates that define the field of view 70. Based on the coordinates that define the field of view 70, the restriction server 50 returns a data object 71 to the camera device 54 (e.g., via wireless communication) that includes coordinates that define boundaries 72 of any restricted areas 74 that overlap the field of view 70. The data object 71 may also define a type of restriction associated with any restricted area, such as video restriction, still image restriction, audio restriction, date/time restriction, etc. The coordinates may define a restricted area 74 (e.g., outside the boundary 72) and a non-restricted area 76 (e.g., inside the boundary 72). The boundary 72, and thus the restricted area 74, may have any desired size and shape. In some instances, the restricted area 74 may be defined inside the boundary 72.

Figure 3:
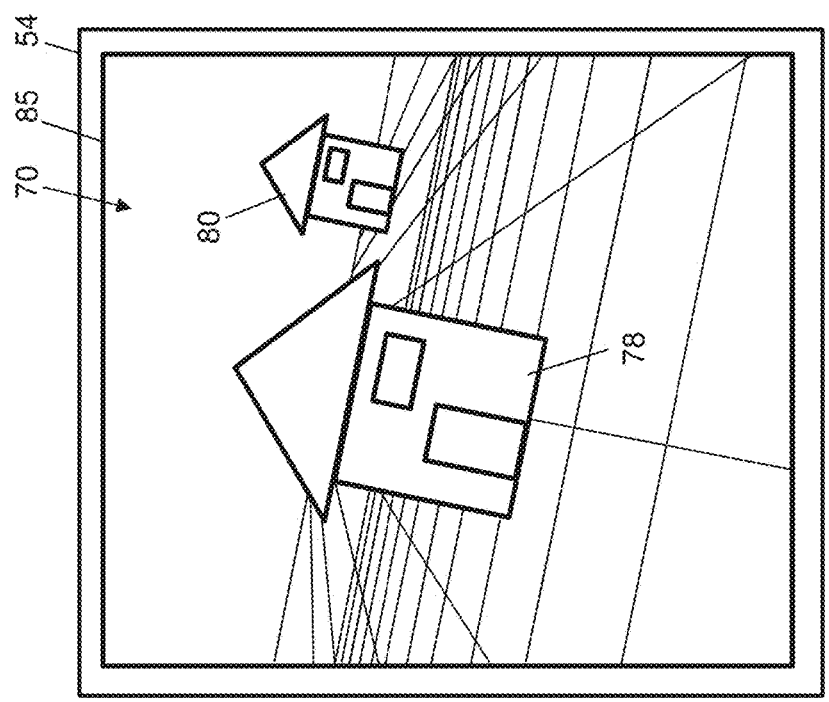

With continued reference to FIG. 2, in the event that the data object 71 returned by the restriction server 50 does not define any restricted areas within the field of view 70, then the restriction module 48 enables the camera device 54 to capture a video, image, or audio in the field of view 70 in a conventional manner, e.g., without any restrictions. In this situation, the field of view 70, including any objects 78 and 80 contained therein, may be displayed on a display system 85 (e.g., an LCD display) of the camera device 54 as shown in FIG. 3.

On the other hand, the data object 71 returned by the restriction server 50 may define a boundary 72 of a restricted area 74 within the field of view 70. In embodiments, based on comparing the coordinates that define the field of view 70 and the coordinates that define the boundary 72, the restriction module 48 determines that the camera device 54 is permitted to capture video, image, or audio from non-restricted area 76 but not from restricted area 74.

In accordance with aspects of the invention, the restriction module 48 may be configured to perform one or more restriction actions when the restriction module 48 determines there is a restricted area 74 in the field of view 70 of the camera device 54. In embodiments, the restriction actions include: notifying the user of the camera device 54 that the field of view 70 overlaps a restricted area 74 (e.g., FIG. 4); displaying a boundary of the restricted area 74 on a display of the camera device 54 (e.g., FIG. 5); and filtering content that is contained in the restricted area 74 (e.g., FIG. 6).

In embodiments, the camera device 54 may be configured to permit the user to enable or disable each of the restriction actions independent of the other restriction actions. For example, the camera device 54 may be configured to permit the user to enable or disable the notification restriction action shown in FIG. 4. Further, the camera device 54 may be configured to permit the user to enable or disable the boundary display restriction action shown in FIG. 5. Still further, the camera device 54 may be configured to permit the user to enable or disable the filtering restriction action shown in FIG. 6. In this manner, the user can define default behavior for appropriate action for the camera device 54 for determined restricted areas.

Figure 4:
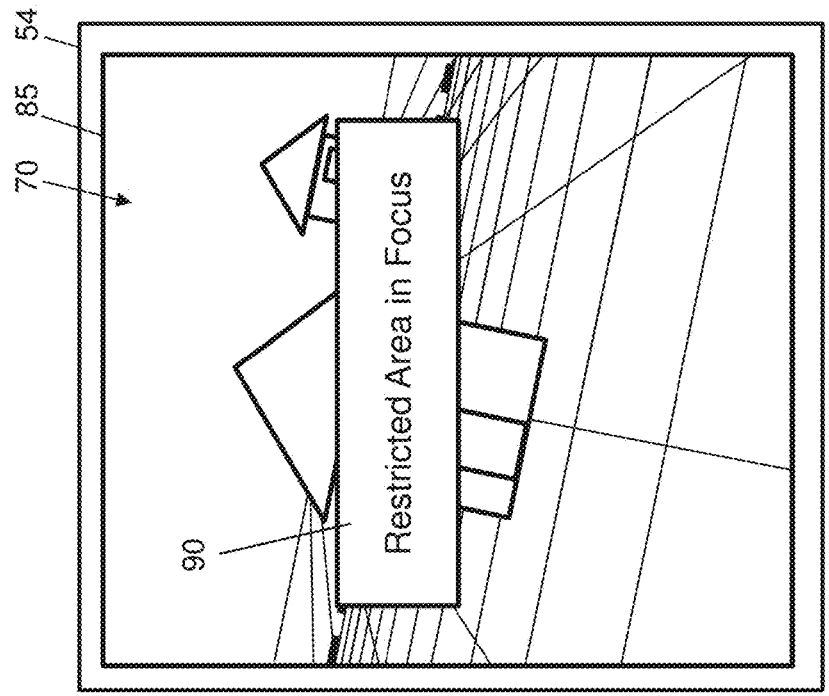
FIGS. 3-6 show exemplary implementations of aspects of the invention.
Figure 6:
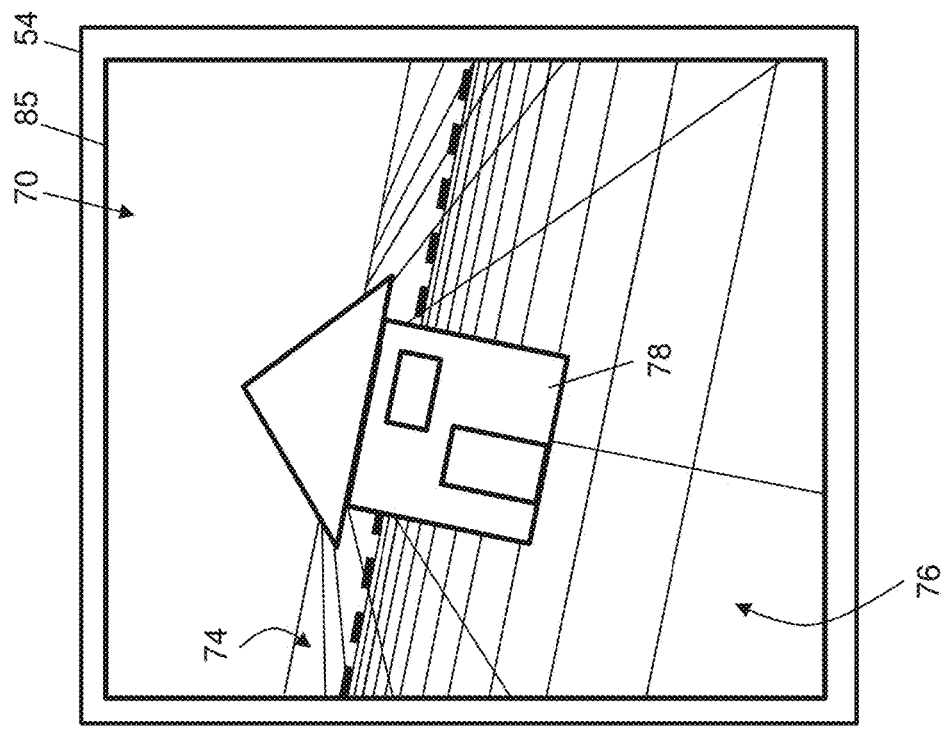
Figure 5:
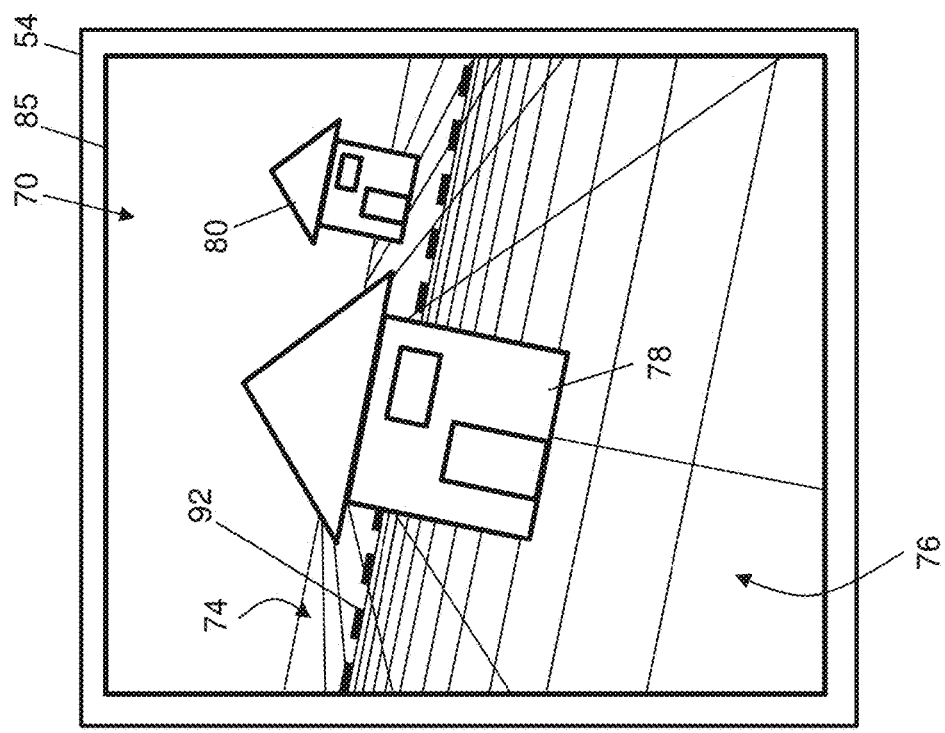

FIGS. 4-6 show exemplary implementations of aspects of the invention based on the exemplary field of view 70, restricted area 74, non-restricted area 76, and objects 78, 80 shown in FIG. 2. Specifically, FIGS. 4-6 show the field of view 70 of the camera device 54 displayed on a display system 85 (e.g., an LCD display screen) of the camera device 54. As shown in FIGS. 4-6, the camera device 54 may be configured to display grid lines on the displayed field of view.

FIG. 4 shows an embodiment of a first restriction action in which the camera device 54 shows a notification 90 on the display system 85 based on a determination that there is a restricted area 74 in the field of view 70 of the camera device 54. The notification 90 may have any desired size, shape, color, and text. The notification 90 may additionally or alternatively include an audible alert that is broadcast by the camera device 54. The notification 90 may additionally include information regarding a type of restriction, such as for example whether video and/or image and/or audio capture is restricted for the identified restricted area 74. In this manner, when a restricted area is determined in the field of view and when the notification restriction action is enabled on the camera device 54, the user will receive the notification 90 on the display system 85 that the location, object, or person in focus is restricted from being captured on video, image, or audio.

FIG. 5 shows an exemplary embodiment of a second restriction action in which the camera device 54 shows a boundary 92 on the display system 85 based on a determination that there is a restricted area 74 and a non-restricted area 76 in the field of view 70 of the camera device 54. In embodiments, when a restricted area 74 is determined in the field of view 70 and when the boundary display restriction action is enabled, the display system 85 displays a boundary 92 between the restricted area 74 and the non-restricted area 76. The boundary 92 may include a line or other shape that is displayed between the restricted area 74 and the non-restricted area 76. In this manner, the boundary 92 may be displayed to indicate to a user that a first object 78 is in a non-restricted area 76, and that a second object 80 is in a restricted area 74. The boundary display thus informs the user to change the focus or direction of the field of view 70 of the camera device 54 to an area that is not restricted.

FIG. 6 shows an exemplary embodiment of a third restriction action in which the camera device 54 filters content in the display system 85 based on a determination that there is a restricted area 74 and a non-restricted area 76 in the field of view 70 of the camera device 54. In embodiments, when a restricted area 74 is determined in the field of view 70 and when the filtering restriction action is enabled, any objects that are present in the field of view beyond the defined boundary are filtered from the captured video/image/audio. For example, as shown in FIG. 6, object 80 is filtered out of the field of view 70 that is displayed on the display system 85, and the image captured by the camera device 54 will create a blank area in the place of the filtered object 80 (e.g., superposed on the filtered object). Still referring to FIG. 6, object 78 is within the non-restricted area 76 and as such is included in the displayed field of view 70 and will be included in the image captured by the camera device 54.

The filtering of objects may be performed based on determining whether an object in the field of view of the camera device is also within the restricted area. In embodiments, the camera device 54 may use a range-finding system to determine a location of an object (e.g., objects 78, 80) relative to the camera device 54. For example, a range-finding system may be used to determine a distance from the camera device 54 to an object within the field of view 70, and also a compass direction of the object relative to the camera device 54. As described herein, the camera device 54 may determine coordinates (e.g., GPS coordinates) of a location of the camera device 54. The camera device 54 may also obtain coordinates that define a boundary between the restricted area 74 and the non-restricted area 76. Using this data, the camera device 54 may determine coordinates of an object (e.g., object 78) based on the coordinates of the camera device 54 and a direction and distance of the object relative to the camera device 54. The camera device 54 may then compare the coordinates of the object to the coordinates of the restricted area 74 to determine whether the object is inside or outside the restricted area. The camera device 54 may then filter any objects that are determined as being inside the restricted area.

In aspects, the data file of a captured image or video will not include any filtered objects, and instead will include a blank space in place of a filtered object. The camera device 54 may be configured to permit a user to replace the blank space with a desired color and/or visual pattern.

Still referring to the filtering restriction action, the camera device 54 may also be configured to filter audio content that originates from within a determined restricted area 74 in the field of view 70. In embodiments, software installed on the camera device 54 identifies a source of sound from a point of capture. The software may also be configured to determine the distance of the sound from the location of the camera device 54. In this manner, the camera device 54 may determine whether a sound originated within the restricted area 74 in the field of view 70, and filter any such audio from a captured video file.

According to further aspects of the invention, a user of the camera device 54 may be permitted to un-filter content that is filtered by a filtering restriction action. In embodiments, a user may subscribe to a service allowing them to use the camera device 54 to safely capture video, images, and audio at specific location that is defined as restricted by the restriction server 50. For example, based on the location of the camera device 54 and the field of view 70, software installed at the restriction server 50 may be used to determine whether the user subscribes to a service that allows capture of contents at the restricted location. In this manner, even though an area in the field of view of the camera device may be defined as a restricted area, the user of the camera device 54 may still be permitted to capture content in the restricted area as a result of the subscription-based un-filtering. Accordingly, the content captured by the video device 54 would be stored without filtering restrictions, and optionally may include a service receipt as proof that the user is authorized to capture the content. This embodiment may be particularly advantageous, for example, at a performance in which the performer wishes to permit subscribers to record the performance and prohibit non-subscribers from recording the performance.

According to even further aspects of the invention, a user of the camera device 54 may access the restriction server 50 to determine restricted areas prior to attempting to capture a video, image, or audio with the camera device 54. For example, there may be situations where the user takes the camera device 54 to a location that does not support wireless communication between the camera device 54 and the restriction server 50. In these situations, the user may wish to identify restricted areas at the location prior to traveling to the location. Accordingly, in embodiments, the system may be configured to allow a user to search the restriction server 50 for the locations they plan to visit, and then cause the camera device 54 to generate an alert when they are nearby the location prior to losing network capability. In additional embodiments, the system may be configured to compare locations defined in the user's electronic calendar to restricted areas defined in the restriction server 50, and alert the user when there is a match between a calendar location and a restricted area.

Figure 7:
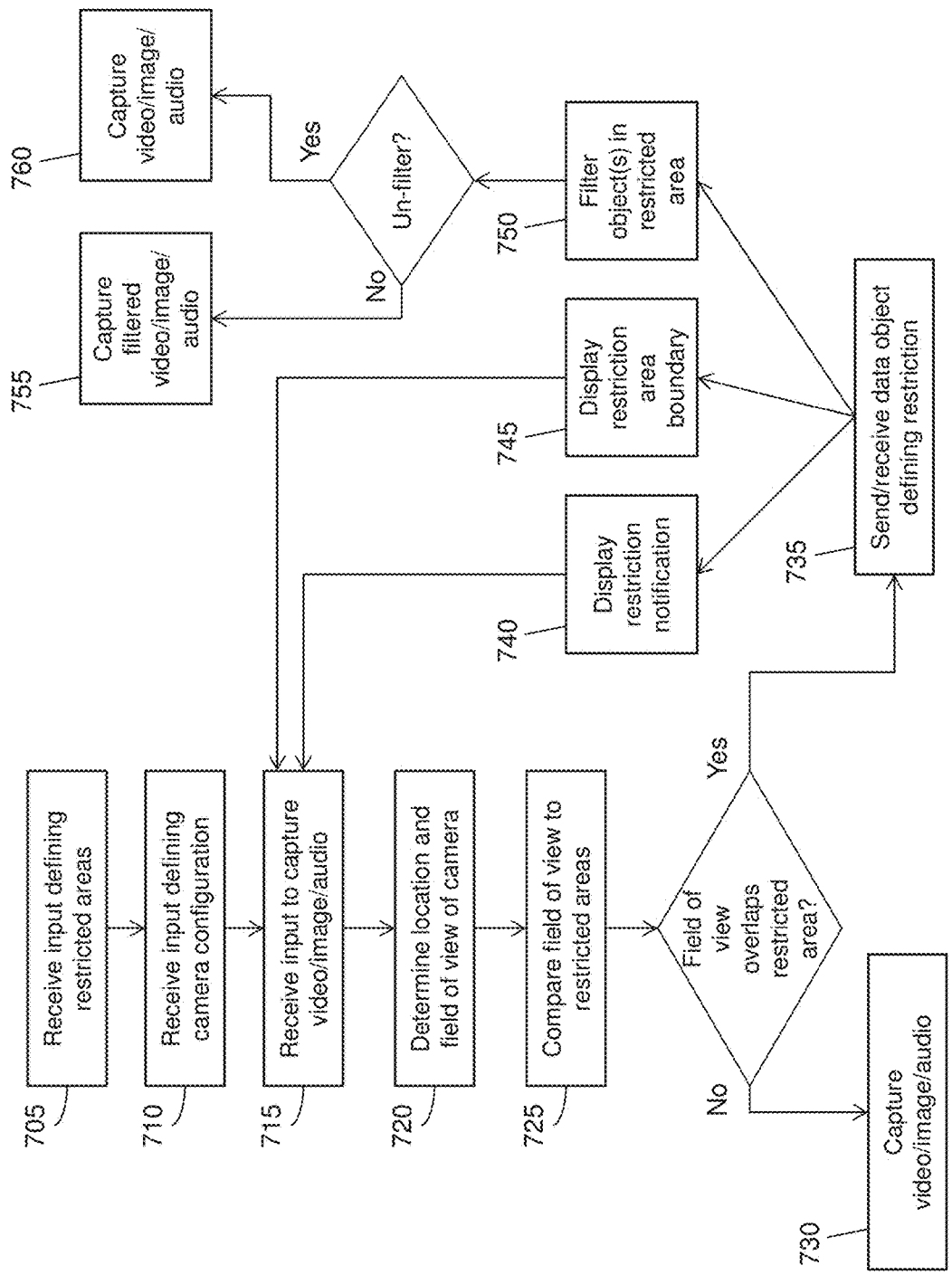
FIG. 7 shows a flowchart of steps of an exemplary method for performing aspects of the invention.

FIG. 7 shows a flowchart of steps of an exemplary method for performing aspects of the present invention. The steps of FIG. 7 may be implemented in the environment of any of FIGS. 1-2, for example. As noted above, the flowchart(s) illustrate the architecture, functionality, and operation of possible implementations of systems, methods, and computer program products according to various embodiments of the present invention.

At step 705, restricted areas are defined. In embodiments, the restriction server 50 receives input that defines the restricted areas. The input may be received from one or more entities, and data defining the restricted areas may be stored by the restriction server 50 in a data repository. Each restricted area may be defined by data that indicates: coordinates (e.g., boundary) of the restricted area; video restriction (yes or no); image/photo restriction (yes or no); audio restriction (yes or no); date/time restriction.

At step 710, a camera device is configured. In embodiments, the camera device receives user input that defines: enabling or disabling notification restriction action; enabling or disabling boundary display restriction action; and enabling or disabling filtering restriction action. The input may be received via an input/output system of the camera device, such as a display screen with graphic user interface. Step 710 may include the camera device receiving subscription information from the user, such as a user name and password to an un-filtering service.

At step 715, the camera device receives an input to capture content. In embodiments, step 715 involves a user initiating taking a picture or video with the camera device 54, e.g., pressing a physical button or a virtual button on the camera device 54.

At step 720, a location and field of view of the camera device are determined. In embodiments, the location module 46 determines a location of the camera device 54 and a field of view 70 (or a focus area) of the camera device 54 in the manner described with respect to FIG. 2. In embodiments, the location and field of view are defined using a set of coordinates, e.g., a set of longitude and latitude coordinates.

At step 725, the field of view is compared to the restricted areas. Step 725 may be performed in the manner described with respect to FIG. 2. For example, the restriction module 48 may make a service call to the restriction server 50 in which the restriction module 48 sends the location and field of view coordinates (from step 720) to the restriction server 50. In embodiments, the restriction server 50 compares the location and field of view coordinates to the coordinates of restricted areas stored in the data repository (from step 705) to determine whether the field of view coordinates overlap any of the restricted areas.

In the event that there is no overlap of the field of view coordinates and the restricted areas, then at step 730 the camera device is enabled to capture the content in the field of view without restriction. For example, the restriction server 50 may return an empty data object to the camera device 54, which enables the camera device 54 to capture the content (e.g., video, image, audio) in a conventional manner without any restrictions, e.g., by collecting light through the lens 58, capturing an image with the image sensor 56, optionally performing digital processing of the captured image via the processor 20, storing data defining the image in memory 22A, and displaying the image on the display.

On the other hand, in the event that there is overlap of the field of view coordinates and at least one of the restricted areas, then at step 735 the restriction server 50 returns a data object defining the restricted area to the camera device 54. In embodiments, the data object includes data defining the restricted area including: coordinates (e.g., boundary) of the restricted area; video restriction (yes or no); image/photo restriction (yes or no); audio restriction (yes or no); date/time restriction.

After receiving the data object at step 735, the camera device performs one of more of steps 740, 745, 750 based on the configuration data from step 710. For example, when notification restriction action is enabled, then at step 740 the camera device 54 displays a notification 90 over the displayed field of view, e.g., as in FIG. 4. When boundary display restriction action is enabled, then at step 745 the camera device 54 displays a boundary 92 in the displayed field of view, e.g., as in FIG. 5. When filtering restriction action is enabled, then at step 750 the camera device 54 filters an object and/or area in the displayed field of view, e.g., as in FIG. 6. Plural restriction actions may be performed together. For example, the display system 85 may display both the notification 90 and the boundary 92 at the same time. Other combinations of the restriction actions may also be used.

Following steps 740 and 745, the camera device is prevented from capturing the content, thus prompting the user to change the field of view and/or focus of the camera device. The process then returns to step 715.

Following step 750, the system determines whether the user subscribes to an un-filtering service for the determined restricted area. In the event that the user does not subscribe to an un-filtering subscription for the determined restricted area, then at step 755 the camera device captures the content with the restricted object or area filtered out of the media file. For example, a blank space may be superposed over the restricted object or area. On the other hand, in the event that the user does subscribe to an un-filtering subscription for the determined restricted area (e.g., as input at step 710), then at step 760 the camera device captures the content without any filtering.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a camera device, comprising: receiving, via a user interface of the camera device and from a user of the camera device, input to independently enable or disable respective ones of plural restriction actions independently of enabling or disabling others of the plural restriction actions, wherein the camera device comprises one of a smartphone, a digital point-and-shoot camera, and a digital single-lens reflex camera, and the camera device is configured to selectively perform each of the plural restriction actions including a notification restriction action, a boundary display restriction action, and a filtering restriction action, wherein the restriction actions further include at least one selected from a group consisting of: preventing videoing; preventing still image photography; and preventing audio recording;

receiving, by the camera device, an input to capture content; determining, by the camera device, a field of view of the camera device; transmitting, by the camera device, data defining the field of view to a server; receiving, by the camera device, a data structure from the server; and based on the data structure, performing one of: capturing the content with the camera device without restriction; and performing a user-enabled one of the plural restriction actions at the camera device, wherein the input to independently enable or disable each one of the plural restriction actions, independently of enabling or disabling the other restriction actions, permits the user to define default behavior applying one or more of the restriction actions for determined restricted areas.

2. The method of claim 1, wherein the content comprises one of video, image, and audio content.

3. The method of claim 1, wherein the data structure defines a restricted area that overlaps the field of view of the camera device.

4. The method of claim 3, wherein the performing the one of the plural restriction actions comprises notifying a user of the camera device that the field of view overlaps the restricted area.

5. The method of claim 4, wherein the notifying comprises displaying a visual notification of the restricted area on a display system of the camera device.

6. The method of claim 4, wherein the notifying comprises displaying a boundary defining the restricted area on a display system of the camera device.

7. The method of claim 3, wherein the performing the one of the plural restriction actions comprises filtering an object in the restricted area on a display system of the camera device.

8. The method of claim 7, further comprising capturing the content with the camera device such that a blank area covers the filtered object in the restricted area.

9. The method of claim 8, further comprising receiving input to re-color the blank area in a stored media file.

10. The method of claim 7, further comprising receiving input to un-filter the filtered object in the restricted area, wherein the input to un-filter comprises user subscription information of an un-filtering service.

11. The method of claim 3, wherein the restricted area and the field of view are defined by respective sets of coordinates.

12. The method of claim 3, further comprising preventing the camera device from capturing the content based on the restricted area overlapping the field of view.

13. The method of claim 1, further comprising:
determining whether an object within the field of view of the camera device is within a restricted area by:
determining, by the camera device, coordinates of the camera device;
determining, by the camera device, coordinates of the object within the field of view of the camera device; and
comparing, by the camera device, the coordinates of the object to coordinates of the restricted area.

14. A camera device, comprising:
a lens;
an image sensor;
a processor;
a location module configured to determine coordinates of a field of view of the camera device; and a restriction module configured to call a server with the determined coordinates of the field of view to determine whether a restricted area overlaps the field of view, wherein the camera device is configured to selectively perform, via the restriction module, each of plural restriction actions including a notification restriction action, a boundary display restriction action, and a filtering restriction action;

the restriction module is configured to receive a data structure from the server defining the restricted area and, based on the data structure, to perform at least one of the notification restriction action, the boundary display restriction action, and the filtering restriction action, and wherein the restriction actions further include at least one selected from a group consisting of: preventing videoing; preventing still image photography; and preventing audio recording;

the camera device is configured to permit a user to define default behavior for the camera device to operate in response to the determination that the restricted area overlaps the field of view by receiving user input to independently enable or disable each of the notification restriction action, the boundary display restriction action, the filtering restriction action, the preventing of videoing, the preventing still image photography and the preventing of audio recording, independently of enabling or disabling others of the plural restriction actions; and the camera device comprises one of a smartphone, a digital point-and-shoot camera, and a digital single-lens reflex camera.

15. The camera device of claim 14, wherein the restriction module is configured to at least one of:
display a visual notification of the restricted area on a display system of the camera device based on the notification restriction action being enabled;
display a boundary defining the restricted area on the display system of the camera device based on the boundary display restriction action being enabled; and
filter an object in the restricted area on the display system of the camera device based on the filtering restriction action being enabled.

16. The camera device of claim 14, wherein the camera device is configured to access the server to determine a restricted area prior to being used to capture an image.

17. The camera device of claim 14, wherein the user input is received via a graphic user interface of the camera device.

18. A system, comprising:
a server; and
a data repository,
wherein the server is configured to:
receive input identifying restricted areas and store data defining coordinates of the restricted areas in the data repository;
receive input data defining restriction actions, including date/time restrictions regarding the restricted areas and store the date/time restrictions in the data repository, wherein the restriction actions further include at least one selected from a group consisting of: preventing videoing; preventing still image photography; and preventing audio recording;
receive, from a camera device, a service call containing coordinates of a field of view of the camera device;
based on the receiving the service call, determine whether any of the restricted areas overlap the field of view by comparing the coordinates of the field of view to the coordinates of the restricted areas; and
based on the determining, transmit a data structure to the camera device indicating whether any of the restricted areas overlap the field of view and the restriction actions, including the date/time restrictions regarding the restricted areas to cause the camera device to apply the date/time restriction regarding the restricted areas to the camera device,
wherein:
the server receives the service call via wireless communication with the camera device;
the service call comprises an application program interface call;
the received input data allows a user to independently enable or disable respective ones of plural restriction actions independently of enabling or disabling others of the plural restriction actions; and
the input data to independently enable or disable each one of the plural restriction actions, independently of enabling or disabling the other restriction actions, permits the user to define default behavior applying one or more of the restriction actions for determined restricted areas.

19. The system of claim 18, wherein the data structure contains data that defines: coordinates of one of the restricted areas that overlaps the field of view, and at least one of:
an indication of video data being restricted or not restricted in the one of the restricted areas;
an indication of image data being restricted or not restricted in the one of the restricted areas;
an indication of audio data being restricted or not restricted in the one of the restricted areas;
an indication of date and time restrictions associated with the one of the restricted areas.

20. The system of claim 18, wherein:
the camera device comprises one of a smartphone, a digital point-and-shoot camera, and a digital single-lens reflex camera;
the camera device is configured to selectively perform each of plural restriction actions, including a notification restriction action, a boundary display restriction action, and a filtering restriction action, during the date/time restriction; and
the camera device is further configured to permit a user to define default behavior for the camera device to operate in response to the determination that the restricted area overlaps the field of view by receiving user input to independently enable or disable each of the notification restriction action, the boundary display restriction action, and the filtering restriction action, independently of enabling or disabling others of the plural restriction actions.

* * * * *